United States Patent
Kashima et al.

(10) Patent No.: US 11,208,703 B2
(45) Date of Patent: Dec. 28, 2021

(54) NICKEL-CONTAINING STEEL FOR LOW TEMPERATURE SERVICE AND LOW-TEMPERATURE TANK

(71) Applicant: NIPPON STEEL CORPORATION, Tokyo (JP)

(72) Inventors: Kazuyuki Kashima, Tokyo (JP); Takayuki Kagaya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 253 days.

(21) Appl. No.: 16/464,647

(22) PCT Filed: Nov. 30, 2017

(86) PCT No.: PCT/JP2017/043198
§ 371 (c)(1),
(2) Date: May 28, 2019

(87) PCT Pub. No.: WO2018/101447
PCT Pub. Date: Jun. 7, 2018

(65) Prior Publication Data
US 2019/0382863 A1 Dec. 19, 2019

(30) Foreign Application Priority Data
Dec. 1, 2016 (JP) .............................. JP2016-234558

(51) Int. Cl.
*C22C 38/08* (2006.01)
*C21D 9/46* (2006.01)
(Continued)

(52) U.S. Cl.
CPC ............... *C21D 9/46* (2013.01); *C21D 6/004* (2013.01); *C21D 6/005* (2013.01); *C21D 6/008* (2013.01);
(Continued)

(58) Field of Classification Search
CPC .......... C21D 9/46; C21D 6/004; C21D 6/005; C21D 6/008; C21D 8/0205; C21D 8/0263;
(Continued)

(56) References Cited

U.S. PATENT DOCUMENTS 4,946,516 A 8/1990 Yano et al.
2011/0284137 A1 11/2011 Kami et al.

FOREIGN PATENT DOCUMENTS

CN 105683401 A * 6/2016 ........... C22C 38/002
EP 2 871 255 A1 5/2015
(Continued)

OTHER PUBLICATIONS

International Search Report for PCT/JP2017/043198 (PCT/ISA/210) dated Feb. 27, 2018.
(Continued)

*Primary Examiner* — Humera N. Sheikh
*Assistant Examiner* — John D Schneible
(74) *Attorney, Agent, or Firm* — Birch, Stewart, Kolasch & Birch, LLP

(57) ABSTRACT

A nickel-containing steel for low temperature service having a determined chemical composition of a Ni content of from 5.0 to 8.0%, in which the volume fraction of retained austenite in a region of 1.5 mm from a surface in the thickness direction is from 3.0 to 20.0% by volume, and the ratio of the hardness in a region of 1.0 mm from a surface in the thickness direction to the hardness in a region of ¼ of the thickness from a surface in the thickness direction is 1.1 or less, and a low-temperature tank using the nickel-containing steel for low temperature service.

10 Claims, 1 Drawing Sheet

(51) Int. Cl.
    *C21D 6/00*     (2006.01)
    *C21D 8/02*     (2006.01)
    *C22C 38/00*     (2006.01)
    *C22C 38/02*     (2006.01)
    *C22C 38/04*     (2006.01)
    *C22C 38/06*     (2006.01)
    *C22C 38/16*     (2006.01)
    *C22C 38/44*     (2006.01)
    *C22C 38/50*     (2006.01)
    *C22C 38/60*     (2006.01)
    *F17C 13/00*     (2006.01)

(52) U.S. Cl.
    CPC ......... *C21D 8/0205* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/16* (2013.01); *C22C 38/44* (2013.01); *C22C 38/50* (2013.01); *C22C 38/60* (2013.01); *F17C 13/004* (2013.01); *C21D 2211/001* (2013.01); *C22C 38/08* (2013.01); *F17C 2203/0639* (2013.01); *F17C 2221/033* (2013.01); *F17C 2270/0105* (2013.01)

(58) Field of Classification Search
    CPC ............ C21D 2211/001; C22C 38/001; C22C 38/002; C22C 38/005; C22C 38/008; C22C 38/02; C22C 38/04; C22C 38/06; C22C 38/16; C22C 38/44; C22C 38/50; C22C 38/60; F17C 13/004; F17C 2203/0639; F17C 2221/033; F17C 2270/0105
    USPC ........................................................ 420/119
    See application file for complete search history.

(56) References Cited

FOREIGN PATENT DOCUMENTS

| | | |
|---|---|---|
| JP | 9-137253 A | 5/1997 |
| JP | 2002-129280 A | 5/2002 |
| JP | 2009-127069 A | 6/2009 |
| JP | 2010-196164 A | 9/2010 |
| JP | 2013-14812 A | 1/2013 |
| JP | 2015-86403 A | 5/2015 |
| WO | WO 2014/203347 A1 | 12/2014 |

OTHER PUBLICATIONS

Written Opinion of the International Searching Authority for PCT/JP2017/043198 (PCT/ISA/237) dated Feb. 27, 2018.
Extended European Search Report for European Application No. 17877128.3, dated Aug. 2, 2019.

\* cited by examiner

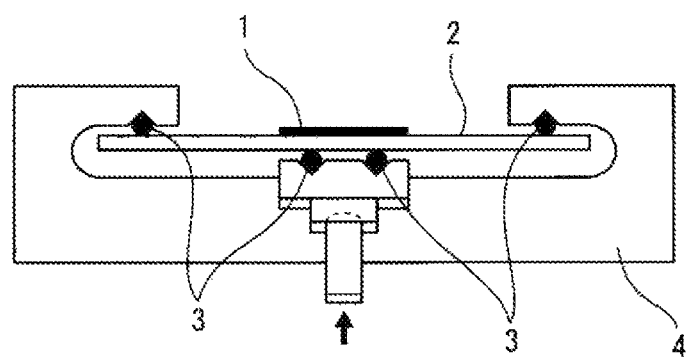

NICKEL-CONTAINING STEEL FOR LOW TEMPERATURE SERVICE AND LOW-TEMPERATURE TANK

TECHNICAL FIELD

The present disclosure relates to a nickel-containing steel for low temperature service and a low-temperature tank.

BACKGROUND ART

Steels having excellent fracture toughness at low temperatures are used in tanks for storage of low-temperature substances such as liquefied natural gas (LNG). As such steels, a steel containing about 9% of Ni (hereinafter, referred to as "9% Ni steel") has been proposed (see, for example, Patent Literature 1). While 9% Ni steels have been widely used heretofore in applications such as LNG tanks for use on land, such steels are almost not actually used currently in ships.

Ni is an expensive alloy element, and nickel-containing steels for low temperature service where the amount of Ni is reduced as compared with 9% Ni steels have been proposed (see, for example, Patent Literatures 2 and 3). A steel containing from more than 11.0 to 13.0% of Ni has been proposed (see, for example, Patent Literature 4) with respect to steels required to have a very high strength of 1270 MPa, have toughness at −70° C., and have stress corrosion cracking resistance to sea water and the like.

Patent Literature 1: Japanese Patent Application Laid-Open (JP-A) No. 2002-129280
Patent Literature 2: JP-A No. 2013-14812
Patent Literature 3: JP-A No. 2015-86403
Patent Literature 4: JP-A No. 09-137253

SUMMARY OF INVENTION

Technical Problem

In a case in which a 9% Ni steel is applied to a shipboard tank (for example, LNG tank for ships), the steel has the problem of stress corrosion cracking in a chloride environment. An event has occurred in the past, where a shipboard tank made of a 9% Ni steel has been cracked in a ship which has been in service for about 25 years, and thus aluminum alloys and/or stainless steels are currently used mainly.

An important challenge for use of a Ni steel for low temperature service in a shipboard tank in the future is to find out a solution to stress corrosion cracking. The content of Ni which is an expensive alloy element is desirably reduced as compared with 9% Ni steels in terms of cost.

The disclosure has been made in view of such circumstances, and an object thereof is to provide a Ni steel for low temperature service containing from 5.0 to 8.0% of Ni and having stress corrosion cracking resistance required for a low-temperature tank such as a shipboard tank, and a low-temperature tank using the same.

Solution to Problem

<1> A nickel-containing steel for low temperature service, the steel comprising, in percentage by mass:
from 0.01 to 0.15% of C,
from 0.01 to 2.00% of Si,
from 0.20 to 2.00% of Mn,
0.010% or less of P,
0.0100% or less of S,
from 5.0 to 8.0% of Ni,
from 0.005 to 2.000% of Al,
from 0.0010 to 0.0100% of N,
from 0 to 1.00% of Cu,
from 0 to 0.80% of Sn,
from 0 to 0.80% of Sb,
from 0 to 2.00% of Cr,
from 0 to 1.00% of Mo,
from 0 to 1.00% of W,
from 0 to 1.00% of V,
from 0 to 0.100% of Nb,
from 0 to 0.100% of Ti,
from 0 to 0.0200% of Ca,
from 0 to 0.0500% of B,
from 0 to 0.0100% of Mg,
from 0 to 0.0200% of REM, and
a balance being Fe and impurities,
wherein a volume fraction of retained austenite in a region 1.5 mm from a surface of the steel in a thickness direction, is from 3.0 to 20.0% by volume, and
wherein a ratio of a hardness in a region 1.0 mm from the surface in the thickness direction to a hardness in a region ¼ of the thickness from the surface in the thickness direction, is 1.1 or less.

<2> The nickel-containing steel for low temperature service according to <1>, wherein a content of the Si is from 0.01 to 0.60% by mass.

<3> The nickel-containing steel for low temperature service according to <1> or <2>, wherein a content of the Al is from 0.005 to 0.100% by mass.

<4> The nickel-containing steel for low temperature service according to any one of <1> to <3>, having a yield strength of from 590 to 800 MPa, a tensile strength of from 690 to 830 MPa, and a Charpy impact absorbed energy at −196° C., of 150 J or more.

<5> The nickel-containing steel for low temperature service according to any one of <1> to <4>, having a thickness of from 6 to 50 mm.

<6> A low-temperature tank comprising the nickel-containing steel for low temperature service according to any one of <1> to <5>.

Advantageous Effects of Invention

According to the disclosure, a Ni steel for low temperature service containing from 5.0 to 8.0% of Ni and having stress corrosion cracking resistance required for a low-temperature tank such as a shipboard tank, and a low-temperature tank using the same can be provided.

BRIEF DESCRIPTION OF DRAWING

FIG. 1 illustrates a chloride stress corrosion cracking test method.

DESCRIPTION OF EMBODIMENTS

Hereinafter, a nickel-containing steel for low temperature service (hereinafter, also referred to as "Ni steel for low temperature service" or "Ni steel material for low temperature service") and a low-temperature tank by way of example of the disclosure will be described in detail.

The designation "%" with respect to the content of each element in a chemical composition in the disclosure means "% by mass".

The designation "%" with respect to the content of each element means "% by mass" in the case of no particular description.

The numerical value range represented by "from . . . to . . . " means that the range encompasses the respective numerical values described before and after "to" as the lower limit and the upper limit.

The term "thickness of any steel" (hereinafter, also designated as "t") means "sheet thickness of any steel sheet" in a case in which the steel is a steel sheet, means "wall thickness of any steel pipe" in a case in which the steel is a steel pipe, and means "diameter of any steel wire or rod steel" in a case in which the steel is a steel wire or rod steel.

The term "thickness direction of any steel" means "sheet thickness direction of any steel sheet" in a case in which the steel is a steel sheet, means "wall thickness direction of any steel pipe" in a case in which the steel is a steel pipe, and means "diameter direction of any steel wire or rod steel" in a case in which the steel is a steel wire or a rod steel.

The Ni steel for low temperature service of the disclosure has a predetermined chemical composition, in which the volume fraction of retained austenite in a region of 1.5 mm from a surface in the thickness direction is from 3.0 to 20.0% by volume, and the ratio of the hardness in a region of 1.0 mm from a surface in the thickness direction to the hardness in a region of ¼ of the thickness from a surface in the thickness direction is 1.1 or less.

The Ni steel for low temperature service of the disclosure contains from 5.0 to 8.0% of Ni according to the above configuration, and thus serves as a steel having stress corrosion cracking resistance required for a low-temperature tank such as a shipboard tank. The Ni steel for low temperature service of the disclosure has been found based on the following findings.

An investigative report with respect to an event where stress corrosion cracking has occurred in a shipboard tank made of a 9% Ni steel (for example, LNG tank for ships) in the past has been already published. The investigative report has recited (1) dew condensation in the tank due to any troubles of facilities and (2) a high hardness of about 420 Hv of a weld heat-affected zone (HAZ) where cracking has occurred, as causes for the occurrence of stress corrosion cracking in the shipboard tank.

In view of such circumstances, there has thus presented a viewpoint that the occurrence of stress corrosion cracking in the shipboard tank made of a 9% Ni steel is based on cracking due to hydrogen. In this regard, it has also been stated that there are not any grounds for the influence of hydrogen sulfide because traces of a S(sulfur) content are not observed in a corrosion product.

Thus, there are many unclear points about the cause for stress corrosion cracking actually occurred in the shipboard tank made of a 9% Ni steel. The present inventors then have considered a process from construction to operation of a shipboard tank, have made reviews about a corrosion environment and an acting stress, and have made studies about the cause for the occurrence of stress corrosion cracking, specifically, as follows.

First, the event where stress corrosion cracking actually occurred has occurred after a lapse of a long period of about 25 years after construction. Secondly, the shipboard tank has been opened and checked periodically (about once every five years). In this regard, tanks for use on land (for example, LNG tanks) not opened and checked do not have any such problems of stress corrosion cracking.

It can be considered in view of such circumstances that the occurrence of stress corrosion cracking is caused by attachment of any salt matter coming from the sea during opening and checking and dew condensation in the shipboard tank. The inventors then have established a test method that can reproduce stress corrosion cracking due to chloride (hereinafter, also referred to as "chloride stress corrosion cracking"), the method being a test including simulating the residual stress of a welded part and adding such a stress, and have made studies about any solution in terms of a material.

As a result, the following findings (a) to (c) have been achieved.

(a) The amount of Ni is from 5.0 to 8.0%, whereby chloride stress corrosion cracking resistance is improved.

(b) In a case in which the ratio of the hardness in a region of 1.0 mm from a surface in the thickness direction (hereinafter, also referred to as "surface layer hardness") to the hardness in a region of ¼ of the thickness from a surface in the thickness direction (hereinafter, also referred to as "t/4 portion hardness") is 1.1 or less (in a case in which hardening of a surface layer is prevented), the occurrence of chloride stress corrosion cracking is remarkably suppressed.

(c) In a case in which the volume fraction of retained austenite in a region of 1.5 mm from a surface in the thickness direction is from 3.0 to 20.0% by volume, the progression of chloride stress corrosion cracking is remarkably suppressed.

It has been found from the foregoing findings that the Ni steel for low temperature service of the disclosure is a steel containing from 5.0 to 8.0% of Ni and having stress corrosion cracking resistance required for, for example, a shipboard tank (namely, chloride stress corrosion cracking resistance).

A low-temperature tank containing the Ni steel for low temperature service of the disclosure can be prevented from being subjected to stress corrosion cracking due to chloride, even in a case in which chloride coming during opening and checking of the low-temperature tank cannot be monitored, and/or, even in a case in which the humidity in the tank is defectively monitored to cause dew condensation in the tank. Therefore, the low-temperature tank is particularly suitable for a shipboard tank (for example, LNG tank for ships).

The low-temperature tank is made by welding a plurality of steels including at least the Ni steel for low temperature service of the disclosure. Examples of the low-temperature tank can include various tanks such as a cylindrical tank and a spherical tank.

Hereinafter, the Ni steel for low temperature service of the disclosure will be described in detail.

[1] Chemical Composition

C: from 0.01 to 0.15%

C is an element necessary for securement of strength. C is required to be contained in an amount of 0.01% or more for securement of strength. The content of C is preferably 0.02% or more, more preferably 0.03% or more, 0.04% or more, or 0.05% or more. In a case in which the content of C is more than 0.15%, a base material and a weld heat-affected zone are deteriorated in toughness. Accordingly, the content of C is 0.15% or less. The content of C is preferably 0.12% or less, more preferably 0.10% or less, 0.09%, or 0.08% or less.

Si: from 0.01 to 2.00% (preferably from 0.01 to 0.60%)

Si is an element necessary for deoxidation. Si is required to be contained in an amount of 0.01% or more in order that the deoxidation effect by Si can be obtained. The content of Si is preferably 0.02% or more, more preferably 0.03% or more from the viewpoint of deoxidation by Si.

Si is also an important element that improves chloride stress corrosion cracking resistance. Si is contained in a large amount, thereby allowing for formation of a corrosion product having cationic selectivity in a corrosion environment. As a result, Si can have an effect of remarkably suppressing the progression of cracking by suppressing penetration of chloride ions into the tip of cracking and thus suppressing dissolution, in the case of the occurrence of cracking. The content of Si may be more than 0.60% in order that such an effect of suppression of the progression of cracking, due to Si, can be obtained. The content of Si is preferably 0.70% or more, more preferably 0.80% or more from the viewpoint of the effect of suppression of the progression of cracking, due to Si.

In a case in which the content of Si is more than 2.00%, not only the effect of suppression of the progression of cracking, due to Si, is saturated, remarkable deterioration in toughness is caused. Accordingly, the content of Si is 2.00% or less from the viewpoint of toughness. The content of Si is preferably 1.80% or less, more preferably 1.50% or less, still more preferably 0.60% or less, 0.50% or less, or 0.40% or less. The content of Si may be 0.35% or less, 0.25% or less, 0.20% or less, or 0.15% or less for a further enhancement in toughness.

Mn: from 0.20 to 2.00%

Mn is an element necessary for securement of strength. Mn is required to be contained in an amount of 0.20% or more for securement of strength. The content of Mn is preferably 0.30% or more, more preferably 0.40% or more, 0.50% or more, or 0.60% or more. In a case in which the content of Mn is more than 2.00%, remarkable deterioration in toughness is caused. Accordingly, the content of Mn is 2.00% or less. The content of Mn is preferably 1.80% or less, more preferably 1.50% or less, 1.20% or less, 1.00% or less, 0.90% or less, or 0.85% or less.

P: 0.010% or less

P is included as impurities, and is an element that is segregated at a grain boundary and deteriorates toughness. In a case in which the content of P is more than 0.010%, remarkable deterioration in toughness is caused. Therefore, the content of P is limited to be 0.010% or less. A lower content of P is more preferable. A preferable upper limit of the content of P is 0.008%, and a more preferable upper limit of the content of P is 0.006%. The lower limit of the content of P is 0%. However, P can be permitted to be contained in an amount of 0.0005% or more, or 0.001% or more, from the viewpoint of production cost.

S: 0.0100% or less

S is included as impurities, and is an element that forms MnS serving as the origin of corrosion in the steel and deteriorates corrosion resistance. Accordingly, the content of S is limited to be 0.0100% or less. A lower content of S is more preferable, a preferable upper limit is 0.0050%, and a more preferable upper limit is 0.0040% or 0.0030%. The lower limit of the content of S is 0%. However, S can be permitted to be contained in an amount of 0.0005% or more, or 0.0010% or more, from the viewpoint of production cost.

Ni: from 5.0 to 8.0%

Ni is an important element. A higher content of Ni results in a more enhancement in toughness at low temperatures. Therefore, N is required to be contained in an amount of 5.0% or more in order that the required toughness is secured. The content of Ni is preferably 5.5% or more, more preferably 6.0% or more, 6.5% or more, or 7.0% or more. In a case in which the content of Ni is more than 8.0%, corrosion resistance in a chloride environment is remarkably enhanced. However, high corrosion resistance easily causes formation of local corrosion marks (local pits), and stress concentrated on such local pits easily causes the occurrence of chloride stress corrosion cracking. Accordingly, the content of Ni is 8.0% or less in order that corrosion in a chloride environment is made more uniform, formation of local pits is suppressed, and chloride stress corrosion cracking resistance is enhanced. The content of Ni is preferably 7.5% or less.

Al: from 0.005 to 2.000% (preferably from 0.005 to 0.100%)

Al is an element necessary as a deoxidizing agent. Al is contained in an amount of 0.005% or more, whereby a deoxidation effect can be obtained. The content of Al is preferably 0.010% or more, 0.015% or more, or 0.020% or more from the viewpoint of deoxidation by Al.

Al is also an important element that improves chloride stress corrosion cracking resistance. Al has an effect of suppressing the occurrence of cracking by remarkably enhancing protection properties of a corrosion product produced in a corrosion environment and suppressing formation of corrosion pits on a surface of a steel material. The content of Al may be more than 0.1% in order that the effect of suppressing the occurrence of cracking, due to Al, can be obtained. The content of Al is preferably 0.200% or more, more preferably 0.300% or more.

In a case in which the content of Al is more than 2.000%, not only the effect of suppressing the occurrence of cracking, due to Al, is saturated, but also remarkable deterioration in toughness is caused. Accordingly, the content of Al is 2.000% or less from the viewpoint of toughness. The content of Al is preferably 1.800% or less, more preferably 1.500% or less, still more preferably 0.100% or less, 0.080% or less, 0.070% or less, 0.060% or less, or 0.050%.

N: from 0.0010 to 0.0100%

N has an effect of miniaturizing crystal grains due to binding to Al for formation of AlN. The effect can be obtained by allowing N to be contained in an amount of 0.0010% or more. However, in a case in which the content of N is more than 0.0100%, toughness is deteriorated. Accordingly, the content of N is from 0.0010 to 0.0100%. A preferable upper limit of the content of N is 0.0080%, and a still more preferable upper limit is 0.0060% or 0.0050%. A preferable lower limit of the content of N is 0.0015%.

A Ni steel for low temperature service according to the present embodiment includes Fe and impurities as the balance, in addition to the above components. The term "impurities" here means components including raw materials such as mineral ore and scraps incorporated due to various factors in a production process during industrial production of the steel, the components being permitted to be incorporated as long as these do not have any adverse effects on properties. However, P and S among impurities are required to be defined with respect to the respective upper limits thereof, as described above.

The Ni steel for low temperature service of the disclosure can contain one or more of Cu, Sn, and Sb, in addition to the above components. That is, such elements need not be contained in the Ni steel for low temperature service of the disclosure, and the lower limit of the content of each of such elements is 0%.

Cu: from 0 to 1.00%

Cu has an effect of enhancing protection properties of a corrosion product produced in a chloride environment, and has an effect of suppressing the progression of cracking by suppressing dissolution at the tip of cracking, in the case of the occurrence of cracking. Therefore, Cu may be contained. However, in a case in which the content of Cu is more than 1.00%, the effects may be saturated, thereby resulting in deterioration in toughness of a base material. Therefore, the content of Cu is 1.00% or less. The content of Cu is preferably 0.80% or less, more preferably 0.60% or less, or 0.30% or less. Cu may be contained in an amount of 0.01% or more in order that the effects due to Cu can be stably obtained. The content of Cu is more preferably 0.03% or more, still more preferably 0.05% or more.

Sn: from 0 to 0.80%

Sn is an element that has an effect of remarkably suppressing the progression of cracking by dissolution as ions at the tip of cracking and suppression of a dissolution reaction with an inhibitor action, in the case of the occurrence of cracking in a corrosion environment. Therefore, Sn may be contained. However, in a case in which Sn is contained in an amount of more than 0.80%, toughness of a base material may be remarkably deteriorated. Therefore, the content of Sn is 0.80% or less. The content of Sn is preferably 0.40% or less, more preferably 0.30% or less, 0.10% or less, 0.03% or less, or 0.003% or less. The content of Sn may also be more than 0% because the effect can be obtained by Sn contained in an amount of more than 0%.

Sb: from 0 to 0.80%

Sb is an element that has an effect of remarkably suppressing the progression of cracking due to dissolution as ions at the tip of cracking and suppression of a dissolution reaction with an inhibitor action, in the case of the occurrence of cracking in a corrosion environment, as in Sn. Sb may be contained. However, in a case in which Sb is contained in an amount of more than 0.80%, toughness of a base material may be remarkably deteriorated. Therefore, the amount of Sb is 0.80% or less. The content of Sb is preferably 0.40% or less, more preferably 0.30% or less, 0.10% or less, 0.03% or less, or 0.003% or less. The content of Sb may also be more than 0% because the effect can be obtained by Sb contained in an amount of more than 0%.

The Ni steel for low temperature service of the disclosure can contain one or more of Cr, Mo, W, and V, in addition to the above components. That is, such elements need not be contained in the Ni steel for low temperature service of the disclosure, and the lower limit of the content of each of such elements is 0%.

In particular, the Ni steel for low temperature service of the disclosure contains one or more of Cr, Mo, W, and V, whereby chloride stress corrosion cracking resistance is easily improved.

Cr: from 0 to 2.00%

Cr has an effect of enhancing strength. Cr also has an effect of suppressing the occurrence of chloride stress corrosion cracking by deteriorating corrosion resistance of the steel in a thin water layer environment where chloride is present and suppressing formation of local pits. Therefore, Cr may be contained. However, in a case in which the content of Cr is more than 2.00%, the effects may be saturated and toughness may be deteriorated. Therefore, the content of Cr is 2.00% or less. The content of Cr is preferably 1.50% or less, more preferably 1.00% or less, 0.50% or less, 0.25% or less, or 0.10% or less. Cr may be contained in an amount of 0.01% or more in order that the effects due to Cr can be stably obtained.

Mo: from 0 to 1.00%

Mo has an effect of enhancing strength. Mo dissolved in a corrosion environment forms molybdate ions. Chloride stress corrosion cracking of the Ni steel for low temperature service progresses due to dissolution of the steel at the tip of cracking, and molybdate ions act as an inhibitor. That is, in a case in which Mo is contained, molybdate ions suppress dissolution at the tip of cracking in the occurrence of cracking, thereby resulting in a significant increase in cracking resistance. However, in a case in which the content of Mo is more than 1.00%, the effect may be saturated and toughness may be deteriorated. Therefore, the content of Mo is 1.00% or less. The content of Mo is preferably 0.80% or less, more preferably 0.50% or less, 0.15% or less, or 0.08% or less. Mo may be contained in an amount of 0.01% or more in order that the effect due to Mo can be stably obtained. The amount of Mo may be 0.03% or more, or 0.05% or more.

W: from 0 to 1.00%

W has the same effect as in Mo. W dissolved in a corrosion environment forms tungstate ions, thereby suppressing dissolution at the tip of cracking and enhancing chloride stress corrosion cracking resistance, in the case of the occurrence of cracking. Therefore, W may be contained. However, in a case in which the content of W is more than 1.00%, the effect may be saturated and toughness may be deteriorated. Therefore, the content of W is 1.00% or less. The content of W is preferably 0.80% or less, more preferably 0.50% or less, 0.10% or less, or 0.02% or less. W may be contained in an amount of 0.01% or more in order that the effect due to W can be stably obtained.

V: from 0 to 1.00%

V also has the same effect as in Mo. V dissolved in a corrosion environment forms vanadate ions, thereby suppressing dissolution at the tip of cracking and enhancing chloride stress corrosion cracking resistance, in the case of the occurrence of cracking. Therefore, V may be contained. However, in a case in which the content of V is more than 1.00%, the effect may be saturated and toughness may be deteriorated. Therefore, the content of V is 1.00% or less. The content of V is preferably 0.8% or less, more preferably 0.5% or less, 0.10% or less, or 0.02% or less. V may be contained in an amount of 0.01% or more in order that the effect due to V can be stably obtained.

The Ni steel for low temperature service of the disclosure may contain one or two of Nb and Ti, in addition to the above components. That is, such elements need not be contained in the Ni steel for low temperature service of the disclosure, and the lower limit of the content of each such element is 0%.

Nb: from 0 to 0.100%

Nb has an effect of miniaturizing the structure of the steel for enhancements in strength and toughness. Therefore, Nb may be contained. However, in a case in which the content of Nb is more than 0.100%, toughness may be deteriorated. Therefore, the content of Nb is 0.100% or less. The content of Nb is preferably 0.080% or less, more preferably 0.050% or less, 0.020% or less, or 0.005% or less. Nb may be contained in an amount of 0.001% or more in order that the effect due to Nb can be stably obtained.

Ti: from 0 to 0.100%

Ti has an effect of enhancing toughness of a weld heat-affected zone due to binding to N for formation of TiN. Therefore, Ti may be contained. However, in a case in which the content of Ti is more than 0.100%, the effect may be saturated and toughness may be deteriorated. Therefore, the content of Ti is 0.100% or less. The content of Ti is preferably 0.080% or less, more preferably 0.050% or less, 0.020% or less, or 0.010% or less. Ti may be contained in an amount of 0.001% or more in order that the effect due to Ti can be stably obtained.

The Ni steel for low temperature service of the disclosure can contain one or more of Ca, B, Mg, and REM, in addition to the above components. That is, such elements need not be contained in the Ni steel for low temperature service of the disclosure, and the lower limit of the content of each of such elements is 0%.

Ca: from 0 to 0.0200%

Ca reacts with S in the steel to form oxysulfide in a molten steel. The oxysulfide has a spherical shape even after rolling because the oxysulfide is not stretched in a rolling direction by rolling, unlike MnS. The spherical oxysulfide suppresses dissolution at the tip of cracking in the case of the occurrence of cracking, and enhances chloride stress corrosion cracking resistance. Therefore, Ca may be contained. However, in a case in which the content of Ca is more than 0.0200%, degradation of toughness may be caused. Therefore, the content of Ca is 0.0200 or less. The content of Ca is preferably 0.0080% or less, more preferably 0.0040% or less, or 0.0020% or less. Ca may be contained in an amount of 0.0003% or more in order that the effect due to Ca can be stably obtained. The content of Ca is more preferably 0.0005% or more, still more preferably 0.0010% or more.

B: from 0 to 0.0500%

B is an element that has an effect of enhancing strength of a base material. However, in a case in which the amount of B is more than 0.0500%, segmentation of a coarse arsenic compound may be caused to deteriorate toughness of a base material. Therefore, the content of B is 0.0500% or less. The amount of B is preferably 0.0100% or less, more preferably 0.0050% or less, or 0.0020% or less. B may be contained in an amount of 0.0003% or more in order that the effect due to B can be stably obtained.

Mg: from 0 to 0.0100%

Mg is an element that has an effect of producing a fine Mg-containing oxide to miniaturize the grain size of retained austenite (equivalent circle diameter). However, in a case in which the amount of Mg is more than 0.0100%, the oxide may be so largely produced, thereby resulting in deterioration in toughness of a base material. Therefore, the content of Mg is 0.0100% or less. The content of Mg is preferably 0.0050% or less, or 0.0010% or less. Mg may be contained in an amount of 0.0002% or more in order that the effect due to Mg can be stably obtained.

REM: from 0 to 0.0200%

REM is an element that can control the form of inclusion such as alumina and manganese sulfide and that is effective for an enhancement in toughness. However, in a case in which REM is excessively contained, inclusion may be formed to deteriorate cleanliness. Therefore, the content of REM is 0.0200% or less. The content of REM is preferably 0.0020% or less, more preferably 0.0010% or less. REM may be contained in an amount of 0.0002% or more in order that the effect due to REM can be stably obtained.

REM is a general term for 17 elements in total, namely, Sc and Y, and fifteen lanthanoid elements. The amount of REM means the total content of such elements.

[2] Configuration

"The volume fraction of retained austenite in a region of 1.5 mm from a surface in the thickness direction (hereinafter, also referred to as "amount of retained austenite") is from 3.0 to 20.0% by volume"

Retained austenite in the steel suppresses the progression of cracking and remarkably enhances chloride stress corrosion cracking resistance. The reason is because Ni is incrassated in retained austenite, dissolution in a thin chloride solution layer environment is significantly suppressed, and the progression of cracking is remarkably suppressed. A phenomenon of chloride stress corrosion cracking occurs on a steel material surface, and the amount of retained austenite in a region of 1.5 mm from a steel material surface is important.

While a large amount of retained austenite enhances chloride stress corrosion cracking resistance properties, a too large amount of retained austenite causes deterioration in strength and therefore cannot allow for securement of required strength.

Therefore, the volume fraction of retained austenite in a region of 1.5 mm from a surface in the thickness direction is from 3.0 to 20.0% by volume.

The amount of retained austenite may be preferably 4.0% by volume or more, more preferably 5.0% by volume or more from the viewpoint of an enhancement in chloride stress corrosion cracking resistance. In this regard, the amount of retained austenite may also be preferably 15.0% by volume or less, more preferably 12.0% by volume or less, 10.0% by volume or less, or 8.0% by volume or less from the viewpoint of suppression of deterioration in strength.

The amount of retained austenite (volume fraction) is measured by the following method.

A test specimen with an observation surface at a position of 1.5 mm from a surface of a steel material in the thickness direction (1.5 mm in thickness direction×25 mm in width direction×25 mm in longitudinal rolling direction, the observation surface is a 25-mm square surface) is taken. The test specimen is subjected to X-ray diffraction measurement and the volume fraction of a retained austenite phase is quantitatively determined from the respective integrated strengths of (110) (200) (211) planes in an a phase in a bcc structure and (111) (200) (220) planes in a γ phase in an fcc structure.

[3] Hardness

"The ratio of the hardness in a region of 1.0 mm from a surface in the thickness direction (hereinafter, also referred to as "surface layer") to the hardness in a region of ¼ of the thickness from a surface in the thickness direction (hereinafter, also referred to as "t/4 portion") is 1.1 or less"

The hardness is closely related to the occurrence of chloride stress corrosion cracking, and higher hardness more easily causes the occurrence of cracking. A phenomenon of chloride stress corrosion cracking occurs on a steel material surface, and it is usually important to allow the hardness of the surface layer not to be too high as compared with the hardness of the t/4 portion (t: thickness) at which the strength is evaluated. In a case in which the ratio of the surface layer hardness (the hardness in a region of 1.0 mm from a surface in the thickness direction) to the t/4 portion hardness (the hardness in a region of ¼ of the thickness from a surface in the thickness direction) is low, the density of a slip step serving as the origin of the occurrence of chloride stress corrosion cracking is significantly lowered, and the occurrence of chloride stress corrosion cracking is remarkably suppressed.

In a case in which the hardness ratio, namely, the surface layer hardness/(t/4 portion hardness) is more than 1.1, many slip steps are formed on a surface layer high in hardness, and chloride stress corrosion cracking easily occurs. Therefore, the hardness ratio is 1.1 or less. The hardness ratio is preferably 1.05 or less. The lower limit of the hardness ratio is not particularly defined. An increase in hardness is more easily made on a surface, and the hardness ratio is difficult to set to less than 0.9. Accordingly, the hardness ratio may be 0.9 or more.

The hardness ratio is not affected by a measurement method, and is defined as the Vickers hardness ratio.

The Vickers hardness is determined by measuring HV 10 according to JIS Z 2244 (2009).

The steel for low temperature service of the disclosure preferably has the desired strength of a base material (the yield strength is from 590 to 800 MPa and the tensile strength is from 690 to 830 MPa) and the desired toughness of a base material (the Charpy impact absorbed energy at −196° C. (the average of three test specimens) is 150 J or more) in order that the low-temperature tank has sufficient fracture resistance properties to swinging on ships or great earthquakes. The Ni steel for low temperature service of the disclosure, having the above chemical composition and metal structure, is excellent in toughness in a low-temperature range of −60° C. or less, in particular, in a low-temperature environment of around −165° C., is also excellent in chloride stress corrosion cracking resistance properties, and is also suitable for applications where liquefied gases such as LPG and LNG are stored in a low-temperature region.

The yield strength of the Ni steel for low temperature service of the disclosure is preferably from 600 to 700 MPa.

The tensile strength of the Ni steel for low temperature service of the disclosure is preferably from 710 to 800 MPa.

The "Charpy impact absorbed energy at −196° C." of the Ni steel for low temperature service of the disclosure is preferably 150 J or more, more preferably 200 J or more. The upper limit needs not be particularly defined, and may be 400 J or less. It is noted that the "Charpy impact absorbed energy at −196° C." corresponds to the average of the Charpy impact absorbed energy of three of the test specimens.

The yield strength (YS) and the tensile strength (TS) are measured as follows. No. 4 test specimen (in the case of a thickness of more than 20 mm) or No. 5 test specimen (in the case of a thickness of 20 mm or less) prescribed in JIS Z2241 (2011) Annex D is taken at a position of a steel material, at which the distance from one end in the steel material width direction corresponds to ¼ of the steel material width, in a direction perpendicular to a rolling direction. The test specimen taken is used to measure the yield strength (YS) and the tensile strength (TS) according to JIS Z2241 (2011). The yield strength (YS) and the tensile strength (TS) are defined as the respective averages of two of the test specimens, as measured at ordinary temperature (25° C.).

The Charpy impact absorbed energy at −196° C. is measured as follows. Three V-notch test specimens according to JIS Z2224 (2005) are taken at a position of a steel material, at which the distance from one end in the steel material width direction corresponds to ¼ of the steel material width, in a rolling direction. The three test specimens taken are used to perform the Charpy impact test in a temperature condition of −196° C. according to JIS Z2224 (2005). The average of the Charpy impact absorbed energy of the three test specimens is defined as the test result.

The test specimen of a steel material not rolled may be taken in any direction.

The thickness of the Ni steel for low temperature service of the disclosure is preferably from 4.5 to 80 mm, more preferably from 6 to 50 mm, still more preferably from 12 to 30 mm.

Next, a method of producing the Ni steel for low temperature service of the disclosure will be described.

The difference in hardness between the surface layer and the t/4 portion is generated due to the difference in cooling rate in the thickness direction during a quenching heat treatment. The reason for this is because the cooling rate of the surface layer is high and a hard structure is formed. The surface layer can reach the target temperature early as compared with the t/4 portion by an increase in temperature rising speed in a tempering heat treatment step after the quenching heat treatment, and can be long in the retention time at the target tempering temperature (hereinafter, also referred to as "heating temperature of tempering heat treatment") as compared with the t/4 portion. The ratio of the temperature rising speed of the surface layer and the temperature rising speed of the t/4 portion is set to 1.3 or more. Thereafter, the target tempering temperature is retained for 30 minutes or more. As a result, the surface layer can progress in tempering as compared with the t/4 portion, the ratio of the hardness of the surface layer to the hardness of the t/4 portion can be 1.1 or less, and the amount of retained austenite in a region of 1.5 mm from a surface in the thickness direction can be from 3.0 to 20.0% by volume.

Thus, the temperature rise due to a higher temperature rising speed of the surface layer than that of the t/4 portion and thereafter retention at the target tempering temperature for 30 minutes or more in the tempering heat treatment step can be performed by adopting, for example, a method including heating by use of an induction heating apparatus and insertion into a heat treatment furnace retained at the target tempering temperature. While the ratio of the temperature rising speed of the surface layer and the temperature rising speed of the t/4 portion is preferably high, the ratio is technically difficult to set to more than 2.0. The temperature rising speed is increased and the retention time of the surface layer is elongated as compared with the t/4 portion in the tempering heat treatment step for control of the configuration, whereby chloride stress corrosion cracking resistance can be remarkably enhanced while required strength being secured. Only high-speed heating with an induction heating apparatus cannot allow the target tempering temperature to be retained for 30 minutes or more, and therefore the required strength/toughness and chloride stress corrosion cracking resistance cannot be secured.

Hereinafter, one example of preferable production conditions will be described.

A method of smelting a steel is performed as follows. For example, the content of each element in a molten steel is adjusted at a temperature of the molten steel of 1650° C. or less, and thereafter a steel billet is produced by continuous casting. The resulting steel billet is formed into a steel by heating, and hot-rolling and air-cooling or water-cooling. The steel is, if necessary, reheated and subjected to a quenching heat treatment and an intermediate heat treatment. The steel is further subjected to a tempering heat treatment.

The heating temperature in the hot-rolling is from 950 to 1150° C. The heating temperature is 950° C. or more in order to suppress coarsening of AlN or the like for securement of low-temperature toughness. In this regard, the heating temperature is 1150° C. or less because a too high heating temperature may cause a coarse grain size to result in deterioration in low-temperature toughness. The retention time of the heating is from 30 minutes to 180 minutes.

The rolling reduction at 950° C. or less in the hot-rolling is 80% or more in order to conduct grain refining of the metal structure. The upper limit of the rolling reduction at 950° C. or less is 95% or less because an increase in rolling reduction may elongate the rolling time to cause the problem about productivity.

The lower limit of the end temperature in the hot-rolling is 700° C. or more. In this regard, the end temperature in the hot-rolling is 800° C. or less in order to control recover of dislocation introduced by the rolling to provide a fine metal structure.

In a case in which reheating and a quenching heat treatment are conducted after the hot-rolling, air-cooling to 150° C. or less may be conducted. However, in a case in which the reheating and the quenching heat treatment are omitted, water-cooling to 150° C. or less is conducted. The water-cooling starting temperature is 550° C. or more. In a case in which the water-cooling starting temperature is below 550° C., coarse bainite may be partially generated and low-temperature toughness may be deteriorated. The upper limit of the water-cooling starting temperature needs not be particularly limited, and the water-cooling is started immediately after completion of the hot-rolling.

In a case in which the reheating and quenching heat treatment are conducted, the heating temperature is 780° C. or more in order to transform the metal structure to austenite once. In a case in which the heating temperature is above 860° C., low-temperature toughness may be deteriorated by an increase in the grain size of austenite and coarsening of AlN. Therefore, the heating temperature is 860° C. or less. The retention time in the reheating and the quenching is from 20 minutes to 180 minutes. Cooling (quenching) after heating is performed by water-cooling to 150° C. or less.

The intermediate heat treatment is effective for grain refining with respect to the crystal grain diameter and for securement of retained austenite. Therefore, the intermediate heat treatment may be performed, if necessary. The heating temperature is 600° C. or more in order to secure retained austenite. The heating temperature of the intermediate heat treatment is 700° C. or less because a too high heating temperature may increase the amount of austenite and cause instability, thereby reducing the amount of retained austenite. The retention time of the intermediate heat treatment is from 20 minutes to 180 minutes. The cooling method in the intermediate heat treatment includes water-cooling to 150° C. or less for avoidance of embrittlement due to tempering.

The tempering heat treatment is an important step and the temperature rising speed of the surface layer is required to be increased as described above. The tempering heat treatment is also effective for securement of retained austenite, and the heating temperature (tempering temperature) of the tempering heat treatment is 530° C. or more in order to secure retained austenite. A too high heating temperature of the tempering heat treatment increases the amount of austenite and causes instability. In the case of then cooling to low temperatures, transformation of retained austenite to martensite may occur, thereby deteriorating toughness. Therefore, the heating temperature of the tempering heat treatment is 600° C. or less. The retention time (time for which retention is made at the tempering temperature) of the tempering heat treatment is from 30 minutes to 180 minutes. Such cooling is performed by water-cooling to 150° C. or less for avoidance of embrittlement.

The Ni steel for low temperature service according to the embodiment may be a thick steel sheet, a thin steel sheet, a steel pipe, a steel wire, a rod wire, a shaped steel, or the like. The Ni steel for low temperature service may also be a forging having a sheet shape or the like. Examples of the steel pipe include seamless steel pipes and welded steel pipes (electric resistance welded steel pipe, UO steel pipe, and the like). Examples of the shaped steel include H-shaped steels, I-shaped steels, T-shaped steels, chevron steels, channel steels, and steel sheet piles.

Each thickness of the Ni steel for low temperature service (sheet thickness, wall thickness, diameter) is mainly from 6 to 80 mm, and may be less than 6 mm (for example, a thickness of 4.5 mm or 3 mm) or may be more than 80 mm (for example, 100 mm).

EXAMPLES

Each steel having a chemical composition shown in Table 2 was smelted and cast to provide each slab having a thickness of 300 mm, and the slab were subjected to hot-rolling and heat treatments (reheating and quenching heat treatment, intermediate heat treatment, tempering heat treatment, and tempering heat treatment) according to a production method type shown in Table 2 (the conditions of each production method were shown in Table 1), thereby producing each steel sheet having a sheet thickness of from 12 to 80 mm shown in Table 2.

The tempering heat treatment was here performed as follows. The ratio of the temperature rising speed of a surface layer and the temperature rising speed in a region of ¼ in the thickness direction (t/4 portion) (temperature rising speed ratio) was controlled by use of an induction heating apparatus, and heating was conducted to a target temperature. Thereafter, the heat treatment was conducted at the tempering temperature of the surface layer and the retention time of the surface layer (namely, the retention time in the tempering temperature of the surface layer) in a holding furnace.

Cooling after the hot-rolling was performed by air-cooling or water-cooling to 150° C. or less. Each cooling after the reheating and quenching heat treatment, the intermediate heat treatment, and the tempering heat treatment was performed by water-cooling to 150° C. or less.

The "Temperature rising speed ratio ((surface layer)/(t/4 portion))" in Table 1 means that the temperature rising speed ratio corresponds to a ratio obtained by dividing the temperature rising speed of the surface layer by the temperature rising speed of the t/4 portion.

The designation "-" means no treatment performed.

The hardnesses of the surface layer and the t/4 portion of the resulting steel sheet were measured in the mentioned conditions by use of a Vickers hardness tester according to JIS Z 2244 (2009). The hardness of the surface layer was measured at a position of 1.0 mm from a surface of the steel sheet. The amount of retained austenite was determined by preparing a test specimen for retained austenite measurement, the test specimen having a measurement surface at a position of 1.5 mm from a surface of the steel sheet, and conducting measurement according to the mentioned X-ray diffraction method.

The resulting steel sheet was ground so as to provide one surface as a test surface, from an opposite surface, and a specimen for a stress corrosion cracking test, having a width of 10 mm, a length of 75 mm and a thickness of 2 mm was taken. The test surface of the test specimen was polished by sandpaper #600, the resultant was placed on a four-point bending test tool so that the test surface faced upward, and a stress of 590 MPa was added.

Next, the test surface was coated with an aqueous sodium chloride solution so that the amount of a salt attached per unit area was 5 g/m$^2$, and corroded in an environment of a temperature of 60° C. and a relative humidity of 80% RH. The test period was 1000 hours. This method is a chloride stress corrosion cracking test that simulates an environment where a salt is attached into a tank and a thin water layer is formed on a steel surface. The drawing illustrating the state of a test specimen surface coated with the aqueous solution is illustrated in FIG. 1.

As illustrated in FIG. 1, a test specimen 2 where an attached salt 1 is formed on a surface by coating with an aqueous sodium chloride solution is fixed to a tool 4 by a supporting bar 3 made of ceramic or the like, and is such that a predetermined stress is loaded thereto by pushing the center of the lower surface.

The presence of cracking was evaluated by removing a corrosion product from the test specimen subjected to the test, by a physical or chemical procedure, and observing the cross section of a corroded part with a microscope. One where corrosion progressed to 50 μm or more from a surface in the depth direction was rated as "Presence" of cracking, in consideration of irregularities due to corrosion.

Specifically, 20 visual fields in an optical micrograph (270 μm×350 μm) of a cross section of a corroded part etched by nital at a magnification of 500 were observed, and the length from a surface, corresponding to progression in the depth direction, was measured in consideration of irregularities due to corrosion. The maximum of the length was defined as "maximum cracking depth".

The mechanical properties of each steel sheet obtained (yield strength (YS), tensile strength (TS), and the Charpy impact absorbed energy at −196° C. (vE-196)) are shown in Table 3. The mechanical properties of each steel sheet were here measured according to the mentioned methods.

The ratio of the of the hardness of the surface layer to the hardness of the t/4 portion (designated as "Hardness ratio between surface layer and t/4 portion" in the Table), the amount of retained austenite in a region of 1.5 mm from a surface in the thickness direction (designated as "Residue γ at 1.5 mm from surface layer" in the Table), the test results of chloride stress corrosion cracking (namely, maximum cracking depth), and the results of mechanical properties are shown in Table 3.

TABLE 1

| | Hot-rolling | | | | Quenching heat treatment | |
|---|---|---|---|---|---|---|
| | Heating temperature (° C.) | Retention time (min) | End temperature (° C.) | Cooling | Heating temperature (° C.) | Retention time (min) |
| Production method A1 | 980 | 120 | 750 | Air-cooling | 860 | 30 |
| Production method A2 | 1150 | 120 | 780 | Air-cooling | 780 | 30 |
| Production method A3 | 1120 | 100 | 720 | Water-cooling | — | — |
| Production method A4 | 1050 | 90 | 740 | Water-cooling | — | — |
| Production method B1 | 1100 | 120 | 730 | Air-cooling | 850 | 30 |
| Production method B2 | 1120 | 120 | 780 | Air-cooling | 800 | 30 |
| Production method B3 | 1070 | 80 | 710 | Air-cooling | 830 | 30 |
| Production method B4 | 1140 | 80 | 710 | Water-cooling | — | — |

| | Intermediate heat treatment | | Tempering heat treatment | | |
|---|---|---|---|---|---|
| | Heating temperature (° C.) | Retention time (min) | Temperature rising speed ratio ((surface layer)/(t/4)) | Tempering temperature of surface layer (° C.) | Retention time of surface layer (min) |
| Production method A1 | 695 | 50 | 1.7 | 560 | 40 |
| Production method A2 | — | — | 1.6 | 560 | 40 |
| Production method A3 | — | — | 1.7 | 570 | 50 |
| Production method A4 | 670 | 50 | 1.7 | 570 | 40 |
| Production method B1 | 660 | 50 | 1.4 | 560 | 10 |
| Production method B2 | 700 | 50 | 1.7 | 620 | 35 |
| Production method B3 | 640 | 60 | 1.1 | 580 | 90 |
| Production method B4 | 640 | 60 | 1.2 | 580 | 60 |

TABLE 2

| | C | Si | Mn | P | S | Al | N | Ni | Cu | Sn | Sb | Cr | Mo |
|---|---|---|---|---|---|---|---|---|---|---|---|---|---|
| 1 Disclosure Example | 0.08 | 0.10 | 1.33 | 0.009 | 0.0050 | 0.025 | 0.0025 | 5.6 | | | | | |
| 2 Disclosure Example | 0.02 | 0.50 | 0.60 | 0.005 | 0.0030 | 0.030 | 0.0040 | 7.4 | | | | | |

TABLE 2-continued

| | | | | | | | | | | | | | |
|---|---|---|---|---|---|---|---|---|---|---|---|---|---|
| 3 | Disclosure Example | 0.05 | 0.06 | 1.00 | 0.003 | 0.0010 | 0.035 | 0.0040 | 6.3 | | | 0.59 | 0.20 |
| 4 | Disclosure Example | 0.04 | 0.04 | 0.79 | 0.004 | 0.0004 | 0.032 | 0.0025 | 7.3 | | | 0.46 | 0.09 |
| 5 | Disclosure Example | 0.05 | 0.05 | 0.80 | 0.003 | 0.0010 | 0.015 | 0.0025 | 7.0 | | | 0.45 | |
| 6 | Disclosure Example | 0.05 | 0.05 | 0.79 | 0.003 | 0.0010 | 0.012 | 0.0030 | 7.0 | | | | 0.15 |
| 7 | Disclosure Example | 0.06 | 0.07 | 0.83 | 0.001 | 0.0080 | 0.015 | 0.0033 | 6.0 | | | | |
| 8 | Disclosure Example | 0.03 | 0.30 | 0.90 | 0.008 | 0.0030 | 0.055 | 0.0080 | 5.2 | | | | |
| 9 | Disclosure Example | 0.08 | 0.06 | 0.76 | 0.002 | 0.0003 | 0.020 | 0.0045 | 7.7 | | | | |
| 10 | Disclosure Example | 0.11 | 0.10 | 0.65 | 0.001 | 0.0008 | 0.015 | 0.0035 | 6.3 | | | | |
| 11 | Disclosure Example | 0.07 | 0.05 | 0.80 | 0.004 | 0.0035 | 0.022 | 0.0015 | 6.4 | | | 0.05 | |
| 12 | Disclosure Example | 0.05 | 0.04 | 0.75 | 0.004 | 0.0020 | 0.008 | 0.0037 | 5.8 | | | | 0.04 |
| 13 | Disclosure Example | 0.04 | 0.06 | 0.77 | 0.003 | 0.0030 | 0.018 | 0.0030 | 6.3 | 0.58 | | | |
| 14 | Disclosure Example | 0.05 | 0.04 | 0.50 | 0.003 | 0.0020 | 0.022 | 0.0033 | 7.1 | | 0.32 | | |
| 15 | Disclosure Example | 0.03 | 1.50 | 0.82 | 0.001 | 0.0020 | 0.009 | 0.0028 | 5.1 | | | 0.33 | |
| 16 | Disclosure Example | 0.06 | 0.05 | 0.32 | 0.002 | 0.0005 | 0.011 | 0.0041 | 7.8 | | | | |
| 17 | Disclosure Example | 0.07 | 0.25 | 0.55 | 0.003 | 0.0010 | 0.013 | 0.0035 | 6.8 | | | | |
| 18 | Disclosure Example | 0.03 | 0.07 | 0.80 | 0.004 | 0.0020 | 1.650 | 0.0034 | 5.9 | | | | |
| 19 | Disclosure Example | 0.02 | 0.80 | 0.60 | 0.003 | 0.0010 | 0.850 | 0.0020 | 7.5 | | | | |
| 20 | Comparative Example | 0.05 | 0.05 | 0.79 | 0.003 | 0.0010 | 0.013 | 0.0028 | 7.0 | | | | |
| 21 | Comparative Example | 0.04 | 0.05 | 0.76 | 0.003 | 0.0015 | 0.015 | 0.0033 | 7.0 | | | | |
| 22 | Comparative Example | 0.08 | 0.04 | 0.77 | 0.002 | 0.0020 | 0.022 | 0.0037 | 7.1 | | | | |
| 23 | Comparative Example | 0.05 | 0.05 | 0.80 | 0.002 | 0.0015 | 0.015 | 0.0041 | 6.8 | | | | |

| | | W | V | Nb | Ti | Ca | B | Mg | REM | Production method | Sheet thickness (mm) |
|---|---|---|---|---|---|---|---|---|---|---|---|
| 1 | Disclosure Example | | | | | | | | | A | 25 |
| 2 | Disclosure Example | | | | | | | | | A | 15 |
| 3 | Disclosure Example | | | | | | | | | A | 12 |
| 4 | Disclosure Example | | | | | | | | | A | 25 |
| 5 | Disclosure Example | | | | | | | | | A | 50 |
| 6 | Disclosure Example | | | | | | | | | A | 80 |
| 7 | Disclosure Example | 0.05 | | | | | | | | A | 30 |
| 8 | Disclosure Example | | 0.25 | | | | | | | A | 25 |
| 9 | Disclosure Example | | | 0.018 | | | | | | A | 25 |
| 10 | Disclosure Example | | | | 0.056 | | | | | A | 20 |
| 11 | Disclosure Example | 0.45 | | | 0.015 | | | | | A | 15 |
| 12 | Disclosure Example | | 0.45 | 0.007 | | | | | | A | 25 |
| 13 | Disclosure Example | | | | | | | | | A | 25 |
| 14 | Disclosure Example | | | | | | | | | A | 25 |
| 15 | Disclosure Example | | | | | | | | | A | 25 |
| 16 | Disclosure Example | | | | | 0.008 | | | | A | 25 |
| 17 | Disclosure Example | | | | | | 0.009 | | | A | 25 |
| 18 | Disclosure Example | | | | | | | 0.005 | | A | 25 |
| 19 | Disclosure Example | | | | | | | | 0.011 | A | 25 |
| 20 | Comparative Example | | | | | | | | | B1 | 25 |
| 21 | Comparative Example | | | | | | | | | B2 | 25 |
| 22 | Comparative Example | | | | | | | | | B3 | 25 |
| 23 | Comparative Example | | | | | | | | | B4 | 25 |

TABLE 3

| | | Hardness ratio between surface layer and t/4 portion | Residue γ at 1.5 mm from surface layer (% by volume) | Maximum cracking depth (μm) | YS (MPa) | TS (MPa) | vE-196 (J) |
|---|---|---|---|---|---|---|---|
| 1 | Disclosure Example | 1.06 | 3.9 | 25 | 650 | 743 | 212 |
| 2 | Disclosure Example | 1.01 | 7.1 | 13 | 625 | 708 | 284 |
| 3 | Disclosure Example | 1.02 | 6.3 | 0 | 691 | 713 | 205 |
| 4 | Disclosure Example | 1.08 | 8.8 | 0 | 659 | 731 | 265 |
| 5 | Disclosure Example | 1.03 | 8.8 | 0 | 687 | 744 | 201 |
| 6 | Disclosure Example | 1.00 | 8.0 | 0 | 645 | 714 | 254 |
| 7 | Disclosure Example | 0.97 | 5.5 | 18 | 689 | 749 | 295 |
| 8 | Disclosure Example | 1.00 | 3.5 | 30 | 631 | 698 | 287 |
| 9 | Disclosure Example | 0.91 | 10.1 | 0 | 721 | 780 | 241 |
| 10 | Disclosure Example | 1.02 | 6.5 | 16 | 736 | 794 | 180 |
| 11 | Disclosure Example | 0.95 | 6.4 | 18 | 693 | 738 | 202 |
| 12 | Disclosure Example | 1.03 | 6.0 | 20 | 701 | 754 | 246 |
| 13 | Disclosure Example | 1.07 | 6.4 | 0 | 681 | 732 | 237 |
| 14 | Disclosure Example | 1.02 | 8.5 | 0 | 698 | 741 | 278 |
| 15 | Disclosure Example | 1.03 | 3.3 | 36 | 649 | 732 | 294 |
| 16 | Disclosure Example | 1.00 | 10.6 | 0 | 666 | 749 | 265 |
| 17 | Disclosure Example | 1.01 | 7.5 | 10 | 699 | 757 | 244 |
| 18 | Disclosure Example | 0.99 | 5.3 | 21 | 684 | 736 | 199 |
| 19 | Disclosure Example | 1.00 | 7.3 | 12 | 645 | 715 | 247 |

TABLE 3-continued

| | Hardness ratio between surface layer and t/4 portion | Residue γ at 1.5 mm from surface layer (% by volume) | Maximum cracking depth (μm) | YS (MPa) | TS (MPa) | vE-196 (J) |
|---|---|---|---|---|---|---|
| 20 Comparative Example | 1.08 | 0.6 | 220 | 741 | 798 | 164 |
| 21 Comparative Example | 1.05 | 21.3 | 10 | 564 | 688 | 249 |
| 22 Comparative Example | 1.27 | 0.9 | 150 | 721 | 801 | 256 |
| 23 Comparative Example | 1.34 | 0.9 | 150 | 711 | 825 | 288 |

Steels Nos. 1 to 19 having a chemical composition defined in the disclosure, having a ratio of the hardness in a region of 1.0 mm from a surface in the thickness direction to the hardness in a region of ¼ of the thickness from a surface in the thickness direction ("Hardness ratio between surface layer and t/4 portion" in the Table), of 1.1 or less, and an amount of retained austenite in a region of 1.5 mm from a surface in the thickness direction ("Residue γ at 1.5 mm from surface layer" in the Table), of from 3.0 to 20.0% by volume were determined to cause no cracking in the test conditions, and were excellent in chloride stress corrosion cracking resistance. Steel No. 20 and Steels Nos. 20 to 21, having a chemical composition or configuration not falling within the disclosure, were determined to cause cracking, and were highly sensitive to chloride stress corrosion cracking. Steel No. 21 was determined to cause no cracking and was less sensitive to chloride stress corrosion cracking, but did not obtain any mechanical properties as a Ni steel for low temperature service.

INDUSTRIAL APPLICABILITY

The Ni steel for low temperature service of the disclosure can secure stable stress corrosion cracking resistance even in a chloride corrosion environment, for example, near the sea coast, in the case of use in shipboard tanks such as LNG carriers, and is highly industrially applicable.

The disclosure of Japanese Patent Application No. 2016-234558 is herein incorporated by reference in its entity.

All documents, patent applications, and technical standards described herein are herein incorporated by reference, as if each individual document, patent application, and technical standard were specifically and individually indicated to be incorporated by reference.

The invention claimed is:

1. A nickel-containing, steel for low temperature service, the steel comprising, in percentage by mass:
from 0.01 to 0.15% of C,
from 0.01 to 2.00% of Si,
from 0.20 to 2.00% of Mn,
0.010% or less of P,
0.0100% or less of S,
from 5.0 to 8.0% of Ni,
from 0.005 to 2.000% of Al
from 0.0010 to 0.0100% of N,
from 0 to 1.00% of Cu,
from 0 to 0.80% of Sn,
from 0 to 0.80% of Sb,
from 0 to 2.00% of Cr,
from 0 to 1.00% of Mo,
from 0 to 1.00% of W,
from 0 to 1.00% of V,
from 0 to 0.100% of Nb,
from 0 to 0.100% of Ti,
from 0 to 0.0200% of Ca,
from 0 to 0.0500% of B,
from 0 to 0.0100% of Mg,
from 0 to 0.0200% of REM, and
a balance being Fe and impurities,
wherein a volume fraction of retained austenite in a region 1.5 mm from a surface of the steel in a thickness direction, is from 3.0 to 20.0% by volume, and
wherein a ratio of a hardness in a region 1.0 mm from the surface in the thickness direction to a hardness in a region ¼ of the thickness from the surface in the thickness direction, is 1.1 or less.

2. The nickel-containing steel for low temperature service according to claim 1,
wherein a content of Si is from 0.01 to 0.60% by mass.

3. The nickel-containing steel for low temperature service according to claim 1, wherein a content of Al is from 0.005 to 0.100% by mass.

4. The nickel-containing steel for low temperature service according to claim 1, having a yield strength of from 590 to 800 MPa, a tensile strength of from 690 to 830 MPa, and a Charpy impact absorbed energy at −196° C., of 150 J or more.

5. The nickel-containing steel for low temperature service according to claim 1, having a thickness of from 6 to 50 mm.

6. A low-temperature tank comprising the nickel-containing steel for low temperature service according to claim 1.

7. The low-temperature tank according to claim 6, wherein a content of Si is from 0.01 to 0.60% by mass.

8. The low-temperature tank according to claim 6, wherein a content of Al is from 0.005 to 0.100% by mass.

9. The low-temperature tank according to claim 6, the nickel-containing steel for low temperature service having a yield strength of from 590 to 800 MPa, a tensile strength of from 690 to 830 MPa, and a Charpy impact absorbed energy at −196° C., of 150 J or more.

10. The low-temperature tank according to claim 6, the nickel-containing steel for low temperature service having a thickness of from 6 to 50 mm.

* * * * *